United States Patent [19]

Trema

[11] Patent Number: 4,810,039

[45] Date of Patent: Mar. 7, 1989

[54] DEVICE FOR COUPLING IN ROTATION A WHEEL HUB

[75] Inventor: Daniel Trema, Bezons, France

[73] Assignee: Elf France, Courbevoie, France

[21] Appl. No.: 38,203

[22] Filed: Apr. 14, 1987

[30] Foreign Application Priority Data

Apr. 25, 1986 [FR] France ................. 86 06038

[51] Int. Cl.⁴ ............................................. B60B 1/00
[52] U.S. Cl. .......................... 301/9 CN; 301/6 V; 301/105 B; 301/124 R; 301/9 DH
[58] Field of Search ............... 301/1, 6 R, 6 D, 6 S, 301/6 E, 6 V, 105 R, 105 B, 111, 112, 114, 124 R, 5 R, 125, 9 CN, 9 AH, 9 DH, 9 SC, 131, 132, 65; 188/251 R

[56] References Cited

U.S. PATENT DOCUMENTS

| | | | |
|---|---|---|---|
| 1,587,923 | 6/1926 | Rouanet | 301/9 SC |
| 1,609,675 | 12/1926 | Vernon | 301/9 SC |
| 1,813,431 | 7/1931 | Shoemaker | 301/9 CN |
| 2,016,435 | 10/1935 | Isidin | 301/65 X |
| 2,046,779 | 7/1936 | Hack | 301/9 SC |
| 2,257,237 | 9/1941 | Hecht | 301/9 CN |
| 3,102,758 | 9/1963 | Holmes, Jr. | 301/105 R X |
| 3,956,548 | 5/1976 | Kovac et al. | 188/251 R X |
| 4,354,711 | 10/1982 | Main | 301/9 CN |

FOREIGN PATENT DOCUMENTS

| | | | |
|---|---|---|---|
| 201031 | 7/1955 | Australia | 301/9 CN |
| 2517523 | 4/1976 | Fed. Rep. of Germany | 301/6 E |
| 1806566 | 11/1977 | Fed. Rep. of Germany | 301/114 |
| 0051601 | 4/1980 | Japan | 301/6 V |
| 0157604 | 12/1981 | Japan | 301/125 |
| 1392172 | 4/1975 | United Kingdom | 301/105 R |

Primary Examiner—Robert B. Reeves
Assistant Examiner—Russell D. Stormer
Attorney, Agent, or Firm—Burgess, Ryan & Wayne

[57] ABSTRACT

The device for coupling in rotation a wheel hub is intended to couple this hub to a wheel axle and, where necessary, to a brake disk, the wheel hub being fitted sliding on the wheel axle which is extended by a flange in the periphery of which are provided hemi-cylindrical recesses in each of which is housed a head of a screw screwed in the hub and a brake disk can cover the external parts of the screw heads, said device being applied to the simultaneous coupling in rotation of a driving axle for motorcycle to its wheel and to its brake disk.

3 Claims, 1 Drawing Sheet

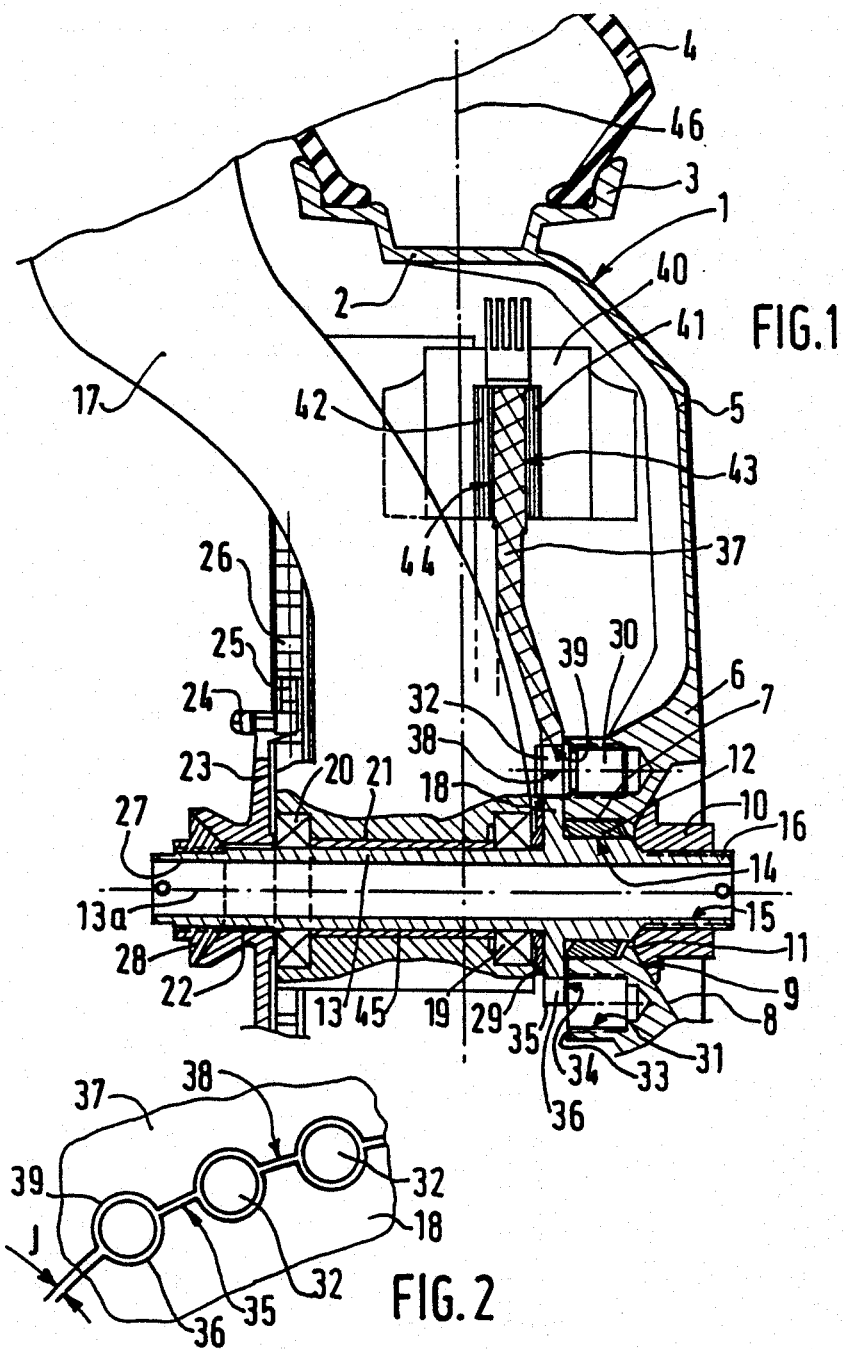

DEVICE FOR COUPLING IN ROTATION A WHEEL HUB

BACKGROUND OF THE INVENTION

1. Field of the invention

The present invention concerns a wheel hub coupling device, and more partiularly a device for coupling for rotation a wheelhub to a wheel axle, especially for a motorcycle wheel as well as for coupling this hub to a brake disk.

2. Summary of the prior art

Wheels of land vehicles are currently economically and reliably produced by molding a light metal alloy such as an aluminum alloy but a problem is encountered with respect to coupling such a wheel, made of a relatively soft material, to supporting and guiding means that are made of relatively hard and rigid materials, to connect said wheel to a support and suspension arm. The soft material of the wheel should be connected at a plurality of connecting points to the hard material generally constituted by hardened steel adapted to support the wheel for rotation at high speed and during a long period of service and to connect said wheel to a suspension arm which is most frequently made of a light alloy, generally by casting or molding.

Connecting a wheel or its support axle to a brake disk having outstanding thermal properties, which is also made of a relatively soft material, such as a carbon fiber disk, raises problems even more difficult to overcome since the disk must be able to expand freely and even to twist slightly while yet remaining integral in rotation with the wheel.

SUMMARY OF THE INVENTION

With this purpose in view, the wheel hub is slidingly fitted onto the wheel axle which is extended, at one end of the hub, by a flange upon which the wheel hub is pressed. Screws with outwardly protruding cylindrical heads are screwed into threaded bores provided in the wheel hub parallel to the axle of the wheel and regularly distributed about the central axis and the cylindrical heads of the screws are each surrounded, on the side of the wheel axle, by the internal wall of an open hemicylindrical recess substantially matching the form of the cylindrical screw head and provided on the peripheral surface of the flange of the wheel axle. The wheel axle onto which the wheel hub is fitted and coupled for rotation is extended, on the side opposite the flange, by a portion for guiding the wheel on two wheel bearings constituted, for example, by ball bearings carried by a wheel support arm. The wheel axle is extended beyond the wheel bearings by a coupling portion with a sprocket ring for rotating the wheel under the action of a motive member, said axle being further extended, beyond the driving sprocket wheel, by a threaded portion onto which a tightening nut is screwed for axially clamping the driving sprocket wheel.

According to another embodiment of the invention, the wheel axle has a central axial bore and a large outer diameter ensuring good guiding of the wheel on its two bearings which are placed at each of the orifices of a support bore provided in a single wheel support arm. The wheel axle is extended on the side opposite the flange by a threaded portion bearing a nut for pressing the wheel hub onto the flange.

According to one advantageous embodiment of the invention, the wheel hub is integral with the wheel made of a relatively soft alloy and its bore for fitting said hub on the wheel axis comprises a sleeve forcibly mounted therein and made of a relatively hard metal.

According to another embodiment, the wheel hub coupling device is also coupled to a brake disk which has a bore provided with open hemi-cylindrical recesses each one substantially matching the form of one of the cylindrical screw heads and which is axially displaceable on these screw heads, the internal bore of the brake disk presenting a diameter slightly greater than that of the external peripheral cylindrical surface of the flange in front of which it rests between the screw heads. The brake disk is advantageously a plate made of a soft material such as carbon fibers and in its central bore of which are formed the hemispherical recesses for receiving the screw heads. The wheel advantageously comprises a bell-shaped web which entirely surrounds the brake disk and its brake caliper(s) in the direction perpendicular to the axis of rotation of the wheel.

BRIEF DESCRIPTION OF THE DRAWING

These and other objects, advantages and features of the invention will become apparent from the following description of an embodiment thereof, given by way of non limitative illustration with reference to the appended drawing in which:

FIG. 1 is a fragmentary sectional view taken in a plane containing the axis of rotation of the wheel, showing substantially one half of the wheel and the entire wheel axle of an embodiment of the coupling device according to the invention;

FIG. 2 is a fragmentary axial view of the zone of the screw heads of the coupling device according to the invention.

DESCRIPTION OF THE PREFERRED EMBODIMENT

FIG. 1 illustrates a wheel 1, constituted by a single molded piece of aluminum alloy the rim 2 of which retains, by its heel 3, a tire 4. Wheel 1 is connected by a thin web 5 to a solid hub 6 which presents bore 7 and an inclined external frontal face 8 on which rests an associated or mating face 9 of a tightening nut 10 which terminates at a shoulder 11. A steel sleeve 12 is forcibly fitted in bore 7. Wheel hub 6 is fitted onto a wheel axle 13 through the intermediary of sleeve 12 that is mounted with a soft rubbing fit on a cylindrical bearing surface 14 of wheel axle 13.

Wheel axle 13 presents a central bore 15 intended to lighten its weight and is extended on the outside of the wheel, by a threaded portion 16 on which is mounted a nut 10 and; on the side of a wheel support arm 17 axle 13 is extended by a flange 18. Beyond the flange 18, wheel axle 13 is extended by surfaces bearing on bearings 19 and 20 carried in a bore 21 of support arm 17, as well as by a splined portion 22 onto which is fitted and coupled for rotation a sprocket wheel 23 on which is attached, through screws 24, a chain-sprocket 25 cooperating with a chain 26 for rotating wheel 1. Beyond sprocket wheel 23, wheel axle 13 is terminated by a threaded portion 27 on which is screwed a nut 28 for clamping sprocket wheel 23. An intermediary rest plate 29 is inserted between flange 18 and ball or roller-bearing 19.

Hub 6 and flange 18 are coupled by means of a series of screws 30 regularly angularly spaced on the hub and extending parallel to the axis of rotation 13a of the wheel. The screws are screwed in threaded bores 31 of relatively large diameter provided in the hub 6, so that the cylindrical screw heads 32 engage bearing surfaces provided on the lateral face 33 of hub 6 contacting the lateral face 34 of flange 18.

Flange 18 bears on its cylindrically shaped periphery 35 a series of hemi-cylindrical recesses 36 open at their outer ends, which are obtained by any known means, especially by milling, when flange 18 is made of steel. These recesses, substantially in the form of a half-cylinder as represented in cross-section in FIG. 1 and viewed end-wise in FIG. 2, correspond each one to one of screws 30 and each recess matches the form of a cylindrical screw head 32 while presenting a diameter slightly larger than that of the associated screw head. Screws 30 are made of a hard and resistant material such as hardened steel and their heads 32 cooperate with the corresponding surfaces of recesses 36 provided in flange 18 which is also made of a hard, resistant material, so as to resist crushing. The shearing forces generated by the driving torque acting on wheel 1 are transmitted to hub 6 of the wheel at a plurality of locations by screws 30 which thus distribute these forces in the mass of hub 6 through the intermediary of their threads. It will be noted that in the lower part of FIG. 1 the threaded bore 31 is represented without its screw 30 in order to show more clearly the form of this bore and its rspective position with respect to the recess 36.

According to one particularly advantageous embodiment of the invention, a brake disk 37 is mounted on the inner side of wheel 1 so that its bore 38 (end view shown on FIG. 2) surrounds the periphery 35 of the flange 18. In order to ensure the coupling of the brake disk 37 (made for example of a material based on carbon fibers and thus producing a relatively soft assembly) with flange 18 and, consequently, with wheel 1, hemi-cylindrical recesses 39 opening towards the inside of bore 38 are provided in this bore, each recess 39 corresponding to a screw 30 so that the recesses 39 match the form of the screw heads 32 by presenting a diameter slightly larger than that of said screw heads. Recesses 39 opening towards the inside of bore 38 of the disk are obtained by any convenient means, such as milling but also, advantageously, by molding in the case of a brake disk made of fibers, especially carbon fibers, due to their naturally tapered form.

The brake disk 37, which is axially mounted so as to "float" on flange 18 and screw heads 32, is in fact retained and guided axially by the brake caliper(s) 40 fixed by convenient means (not shown) to the wheel support arm 17 and the two brake linings 41 and 42 of which are tightly pressed on the respective planar friction surfaces 43 and 44 of disk 37.

The mounting of the wheel 1 on its wheel support arm 17 will now be described in detail. Wheel axle 13 is placed in position in ball bearings 19 and 20 carried by arm 17, by using a spacing piece 45 that maintains the distance between these ball bearings and plate 29 interposed between the lateral face of flange 18 and the inner ring of ball bearing 19. Wheel axle 13 is thereafter fitted with its chain sprocket 25 on which is mounted chain 26, by mounting sprocket wheel 23 on the splines 22 and tightening nut 28.

For mounting wheel 1 on wheel axle 13, wheel hub 6 is first of all equipped with its screws 30 and brake disk 37 is put in position in calipers 40 for contacting brake linings 41 and 42 that position internal bore 38 of this disk exactly opposite flange 18. By rotation and relative displacement of brake disk 37 and flange 18, hemi-cylindrical recesses 39 of disk 37 are placed opposite hemi-cylindrical recesses 36 of the flange 18 so as to form cylindrical recesses or cavities for screw heads 32. Wheel 1 provided with its sleeve 12 is thereafter slid onto cylindrical bearing surface 14 of the wheel axle by presenting screw heads 32 opposite the cylindrical recesses formed between said hemi-cylindrical recesses 36 and 39. Putting screw heads 32 in place in these cylindrical recesses results in simultaneously coupling for rotation brake disk 37 and flange 18 to hub 6, while leaving a radial clearance j (cf. FIG. 2) between internal bore 38 of disk 37 and peripheral surface 35 of flange 18, as well as a rotation clearance which is adjusted by the simultaneous contact of all screw heads 32 with the lateral faces of hemi-cylindrical recesses 36 and 39. Completion of the mounting of wheel 1, only requires tightening nut 10 on threaded portion 16 of wheel axle 13. Face 33 of hub 6 is thus pressed without clearance onto the face 34 of flange 18 with which it forms an integral unit, transmitting however the torques by screw heads 32.

During operation of the motorcycle, the carbon fiber brake disk 37 is subjected, in its friction part, to a severe heating, possibly to up to 800° C., this heat being transmitted through conduction in the direction of the center, thus resulting in expansion and distorsion of bore 38. The clearance j between flange 18 and bore 38 and the clearance between the bottom of recesses 39 of disk 37 and screw heads 32 allow to absorb these expansions and distortions. The steel screw heads 32 present, furthermore, an excellent mechanical resistance even when heated by the disk 37 during braking.

It will be noted that bell-shaped wheel web 5 covers not only the brake disk 37 but also the calipers 40, thus protecting them against mud projections from the wheel. In the embodiment shown, the friction part (faces 43, 44) of the disk 37 is slightly offset with respect to the rolling plane 46 of the wheel but it is obvious that in other embodiments, it is possible to center the friction part of the disk 37 on the rolling plane 46 of the wheel 1 in order to prevent lateral reactions of the wheel during braking.

It is well understood that the present invention is in no way limited to the embodiments described and represented, but can be adapted to numerous variants available to those skilled in the art without departing from the scope and spirit of the invention.

I claim:

1. A wheel assembly for a motor vehicle, comprising a wheel with a wheel hub integral with a wheel web; a wheel axle rotatively supported by a support arm and supporting said wheel hub; a driving wheel mounted onto a splined portion of said axle adjacent one end thereof so as to be coupled to said axle for rotation therewith, said axle having at each one of its two ends threaded outwardly protruding axle end portions; a first clamping nut screwed onto a first one of said two threaded axle end portions adjacent said splined portion and an axially pressing and radially protruding part rigidly connected to said axle so as to clamp said driving wheel against said radially protruding part; a flange integral with said axle adjacent the second threaded axle end portion; a second clamping nut screwed onto said second threaded end portion and axially pressing said hub against said flange, wherein a plurality of screws are screwed into threaded bores provided in said hub and extend parallel to said axle, said bores being located on a circle centered on said axle and equally spaced from one another, and said screws having each a cylindrical head protruding from a related surface of said flange; said flange having at its periphery substantially hemicylindrical recesses, the shape, dimensions as well as the mutual spacing of which are so selected that each cylindrical screw head is adapted to be engaged over substantially one half of its periphery in a mating hemicylindrical recess.

2. A wheel assembly according to claim 1, wherein said wheel is rotatively supported by said support arm through at least one bearing having an outer bearing ring rigidly connected to said arm and an inner bearing ring which is rigidly connected to said axle and which constitutes said radially protruding part.

3. A wheel assembly for a motor vehicle, comprising a wheel with a wheel hub integral with a wheel web; a wheel axle rotatively supported by a support arm and supporting said wheel hub; a driving wheel mounted onto a splined portion of said axle adjacent one end thereof so as to be coupled to said axle for rotation therewith, said axle having at each one of its two ends threaded outwardly protruding axle end portions; a first clamping nut screwed onto a first one of said two threaded axle end portions adjacent said splined portion and an axially pressing and radially protruding part rigidly connected to said axle so as to clamp said driving wheel against said radially protruding part; a flange integral with said axle adjacent the second threaded axle end portion; a second clamping nut screwed onto said second threaded end portion and axially pressing said hub against said flange, wherein a plurality of screws are screwed into threaded bores provided in said hub and extend parallel to said axle, said bores being located on a circle centered on said axle and equally spaced from one another, and said screws having each a cylindrical head protruding from a related surface of said flange; said flange having at its periphery substantially hemicylindrical recesses the shape, dimensions as well as the mutual spacing of which are so selected that each cylindrical screw head is adapted to be engaged by substantially one half of its periphery in a mating hemicylindrical recess; said wheel assembly further comprising a brake disk having a central disk bore which surrounds with a loose fit said flange of the axle and which is provided with hemicylindrical recesses, the shape, dimensions and mutual spacing of which are identical to those of the hemicylindrical recesses of said flange each one of which latter recesses is placed in register with a recess of said disk so as to form therewith a substantially cylindrical recess, whereby the other half of the periphery of each cylindrical screw head is substantially engaged in a corresponding hemicylindrical recess of said disk.

* * * * *